(12) United States Patent
Ogawa et al.

(10) Patent No.: US 7,418,326 B2
(45) Date of Patent: Aug. 26, 2008

(54) STEER-BY-WIRE-SYSTEM

(75) Inventors: Shoji Ogawa, Chiryu (JP); Yoshiyuki Shibata, Toyota (JP); Hiroshi Kuroyanagi, Nagoya (JP); Shoji Asai, Nagoya (JP)

(73) Assignee: JTEKT Corporation, Osaka (JP)

( * ) Notice: Subject to any disclaimer, the term of this patent is extended or adjusted under 35 U.S.C. 154(b) by 493 days.

(21) Appl. No.: 11/261,560

(22) Filed: Oct. 31, 2005

(65) Prior Publication Data
US 2007/0169984 A1    Jul. 26, 2007

(30) Foreign Application Priority Data
Nov. 2, 2004    (JP) .............................. 2004-318841

(51) Int. Cl.
*B62D 5/04* (2006.01)
(52) U.S. Cl. ........................... 701/41; 701/42; 180/402; 180/446
(58) Field of Classification Search ............. 701/41–43; 180/401, 402, 405, 442, 443, 421, 422, 446
See application file for complete search history.

(56) References Cited
U.S. PATENT DOCUMENTS
7,275,617 B2 * 10/2007 Endo et al. ................. 180/402
7,322,439 B2 * 1/2008 Hara et al. .................. 180/402
2003/0055545 A1 3/2003 Uenuma et al.
2003/0220727 A1 11/2003 Husain et al.

FOREIGN PATENT DOCUMENTS
| JP | 2002-145099 | 5/2002 |
| JP | 2003-81111 | 3/2003 |
| JP | 2004-34923 | 2/2004 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

In a steer-by-wire system 10, a first steering reaction force made-up value (Hc1) is determined in dependence on a road reaction force (W), and a second steering reaction force made-up value (Hc2) is determined in dependence on a steering position (X) of a steering handle 11 or steerable wheels 50. A steering reaction force command value (H) is generated from both of the first steering reaction force made-up value (Hc1) and the second steering reaction force made-up value (Hc2) the weightings on which are adjusted by respective weighting gains (G1, G2), and the ratio of the weighting gains is properly altered in dependence on the state of a road surface. Thus, it can be realized to provide the steer-by-wire system 10 capable of adjusting the steering reaction force to be sensitive or insensitive to the state of the road surface.

10 Claims, 13 Drawing Sheets

STEER-BY-WIRE-SYSTEM

INCORPORATION BY REFERENCE

This application is based on and claims priority under 35 U.S.C. 119 with respect to Japanese Application No. 2004-318841 filed on Nov. 2, 2004, the entire content of which is incorporated herein by reference.

BACKGROUND OF THE INVENTION

1. Field of the Invention

The present invention relates to a steer-by-wire system wherein a steering handle of a vehicle is mechanically disconnected from a pair of steerable wheels and wherein a steering motor steers the steerable wheels in dependence on the manipulation of the steering handle while a reaction force motor generates a steering reaction force against the manipulation of the steering handle.

2. Discussion of the Related Art

In conventional vehicles, when a steering handle is turned to steer steerable wheels from a neutral position (the position in which the steerable wheels are to be for traveling the vehicle straight ahead) during the traveling, a road reaction force (the road reaction force in this case is called a "self-aligning torque) acts for returning the steerable wheels to the neutral position. In a steering system (hereafter referred to as "steering system for conventional vehicles") having a steering handle and steerable wheels connected mechanically, the road reaction force is conveyed to the steering handle through a mechanical transmission train, and the driver feels the road reaction force as a steering reaction force against the manipulation of the steering handle.

Also in steer-by-wire systems, it has been desired that the driver can feel a steering reaction force against the manipulation of a steering handle. To this end, in prior steer-by-wire systems, the steering reaction force is falsely generated based on information such as vehicle steering position, vehicle speed and the like as described in, e.g., Japanese unexamined, published patent application No. 2002-145099 (Patent Document 1), whose system will be referred to as "prior steer-by-wire system 1". Alternatively, as those described in Japanese unexamined, published patent applications No. 2003-81111 (Patent Document 2) and No. 2004-34923 (Patent Document 3), a reaction force which steerable wheels of a vehicle receive from the road surface is detected, and a steering reaction force is generated in dependence on the detected road reaction force, the system of which will be referred to as "prior steer-by-wire system 2".

By the way, steer-by-wire systems generally take a construction that a ball screw mechanism or a rack-and-pinion mechanism is provided between an inter-steerable wheel shaft, interposed between a pair of steerable wheels, and a steering motor, and the mechanism is inherently accompanied by mechanical friction. This friction acts as a resistance against the returning of the steering handle to the neutral position in the steering system for the conventional vehicles and makes a cause to deteriorate the returning of the steering handle. The same phenomenon occurs in the prior steer-by-wire system 2 as exemplified in the Patent Documents 2 and 3 and gives rise to the problem.

In the prior steer-by-wire system 1 as exemplified in the Patent Document 1, on the other hand, the phenomenon which is caused by such friction to deteriorate the returning of the steering handle does not arise, but another problem arises in that the state of the road surface is not conveyed to the driver because a steering reaction force which directly reflects the road reaction force cannot be obtained as given in the steering system for the conventional vehicles.

As a prior art example for solving the problem involved in the prior steer-by-wire system 1, there is known a method which as described in the Patent Document 2, adds the steering reaction force which reflects the disturbance of the road surface as given in the prior steer-by-wire system 2, to the steering reaction force given in the prior steer-by-wire system 1. However, because the steering reaction forces given in the prior steer-by-wire systems 1 and 2 are only added simply, the prior art example cannot make use of the advantages of the both systems and hence, is inferior in steering feeling to the steering system for the conventional vehicles.

SUMMARY OF THE INVENTION

Accordingly, in view of the foregoing circumstance, it is a primary object of the present invention to provide an improved steer-by-wire system capable of improving the returning of a steering handle while securing a steering feeling of the same level as that in the steering system for the conventional vehicles and also capable of adjusting the steering reaction force to be sensitive or insensitive in dependence on the state of a road surface.

Briefly, according to the present invention, there is provided a steer-by-wire system having a steering handle disconnected mechanically from a pair of steerable wheels; a steering motor for steering the steerable wheels in dependence on the manipulation of the steering handle; and a reaction force motor for generating a steering reaction force against the manipulation of the steering handle. The system comprises road reaction force detection means for detecting a road reaction force acting on the steerable wheels; first made-up value determination means for determining a first steering reaction force made-up value ($Hc1$) in dependence on the road reaction force detected by the road reaction force detection means; steering position detection means for detecting the steering position of the steering handle or the steerable wheels away from a neutral position; and second made-up value determination means for determining a second steering reaction force made-up value ($Hc2$) in dependence on the steering position detected by the steering position detection means. The system further comprises command value generation means for determining first and second gains ($G1$, $G2$) so that relations $G \leqq C$, $G2 \leqq C$ and $G1+G2=C$ can be satisfied where symbols $G1$, $G2$ and $C$ are taken respectively as first gain, second gain and predetermined constant, and for generating a steering reaction force command value ($H$) which makes the reaction force motor generate the steering reaction force, by an expression $H=G1 \cdot Hc1+G2 \cdot Hc2$ using the first and second gains ($G1$, $G2$).

With this configuration, the steering reaction force command value ($H$) is generated from both of the first steering reaction force made-up value ($Hc1$) determined in dependence on the road reaction force and the second steering reaction force made-up value ($Hc2$) determined in dependence on the steering position of the steering handle or the steerable wheels wherein the values are weighted by the respective weighting gains ($G1$ and $G2$). Thus, since the steering reaction force directly corresponding to the road reaction force is given after being weighted by the first weighting gain ($G1$), it becomes possible to properly convey to the driver the information about the state of the road surface represented by the road reaction force and to return the steering handle by the function of the second steering reaction force made-up value ($Hc2$) without suffering the influence of friction. Further, since the information about the state of the road surface represented by the road reaction force is adjustable by the first gain (G1) in the quantity to be conveyed, it can be easily realized to make the first gain (G1) larger if the quantity to be conveyed is desired to be increased, or to make the first gain G1 smaller if the quantity to be conveyed is desired to be decreased in order to make the steering handle insensitive to the road surface.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 2:
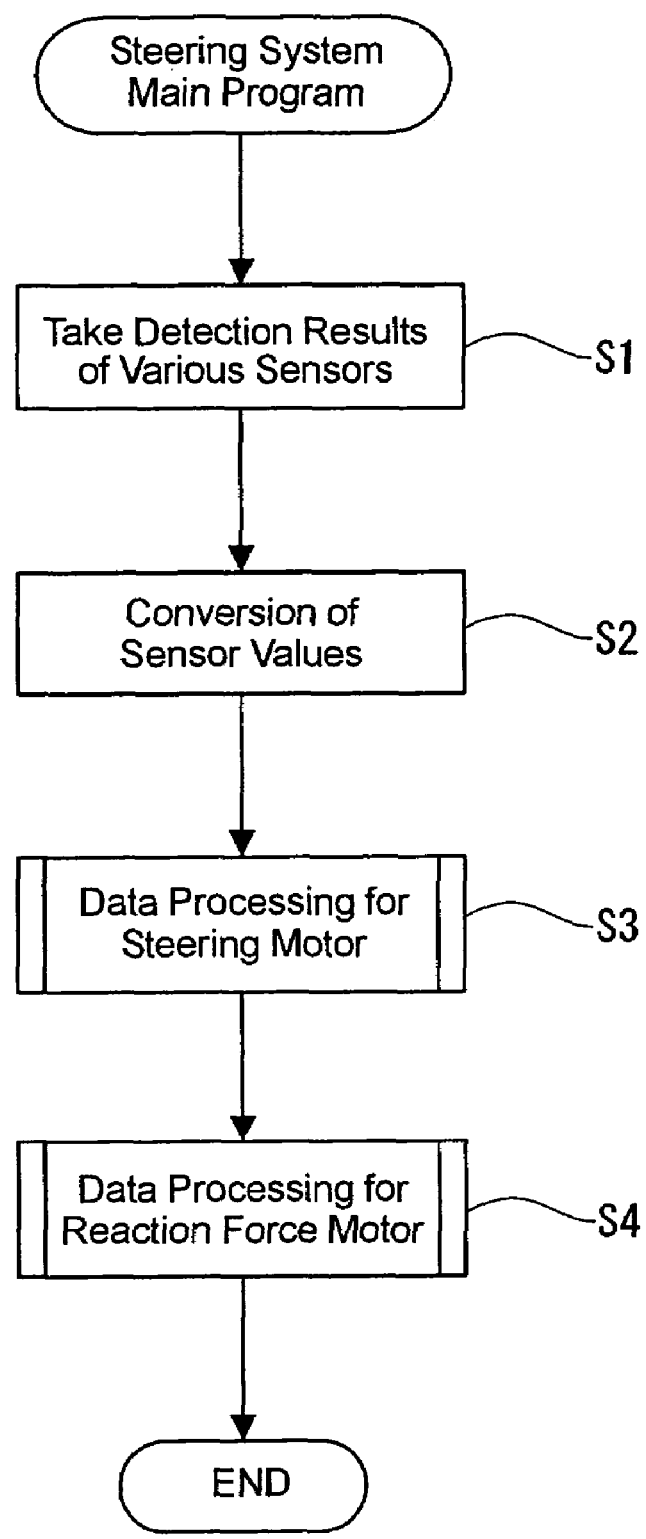
FIG. 2 is a flow chart showing a steering system main program.
Figure 11:
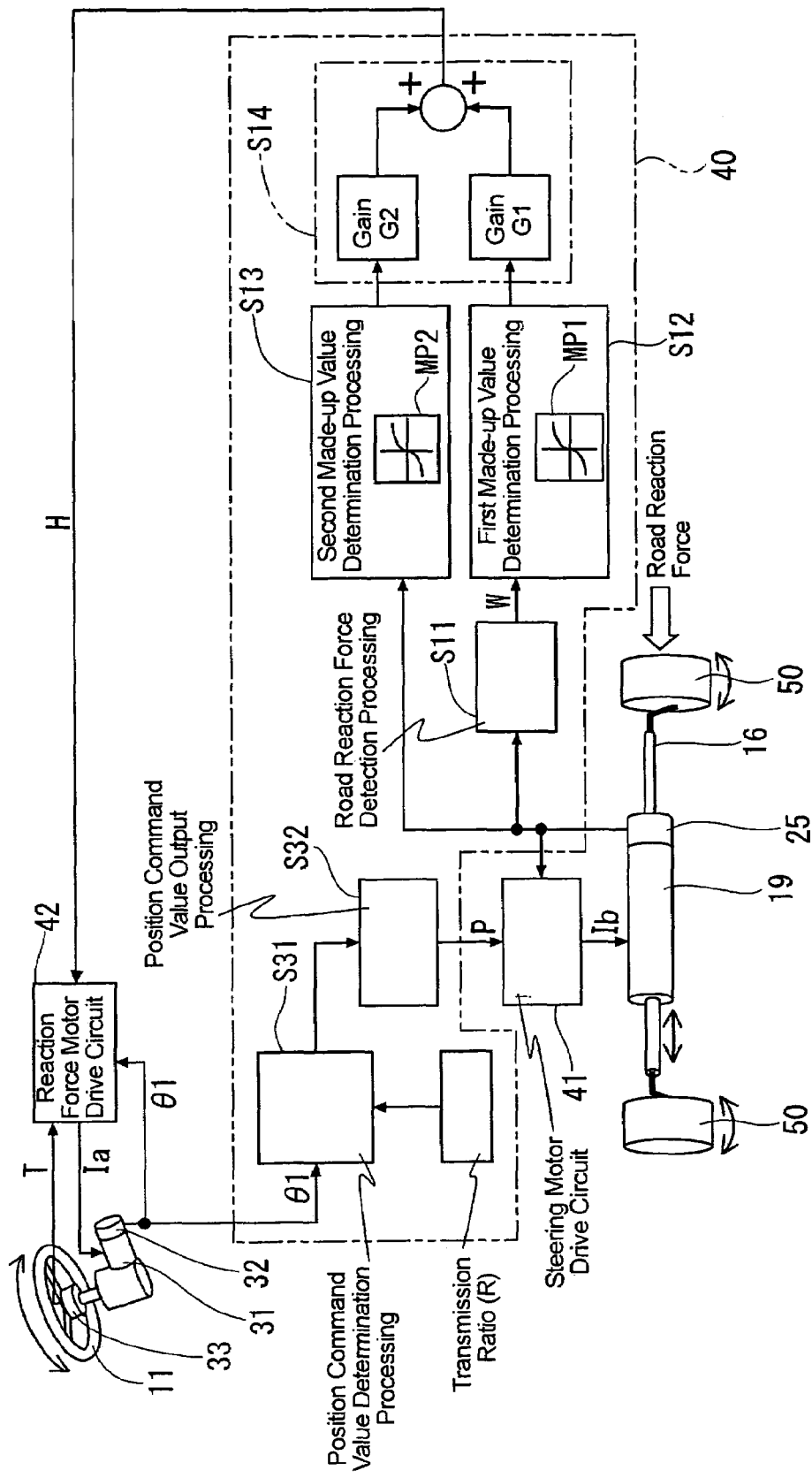
Figure 12:
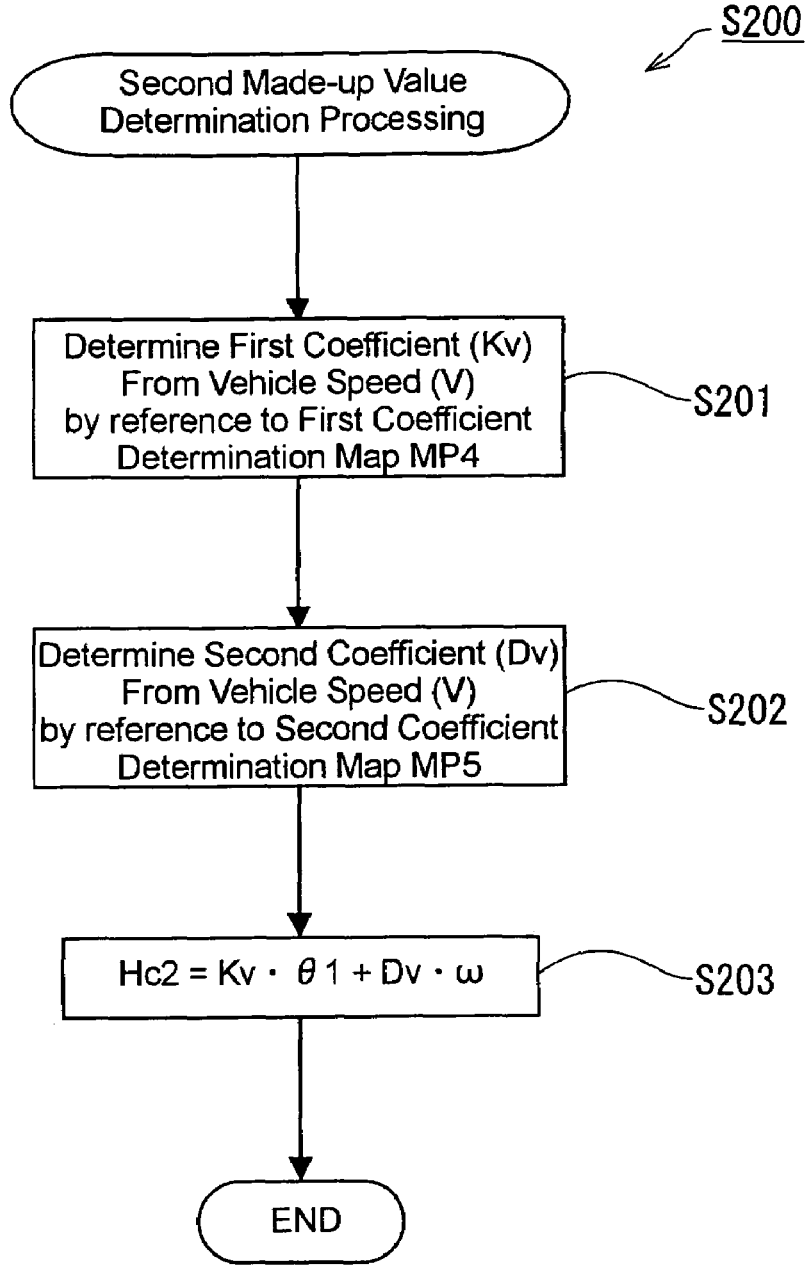
Figure 13:
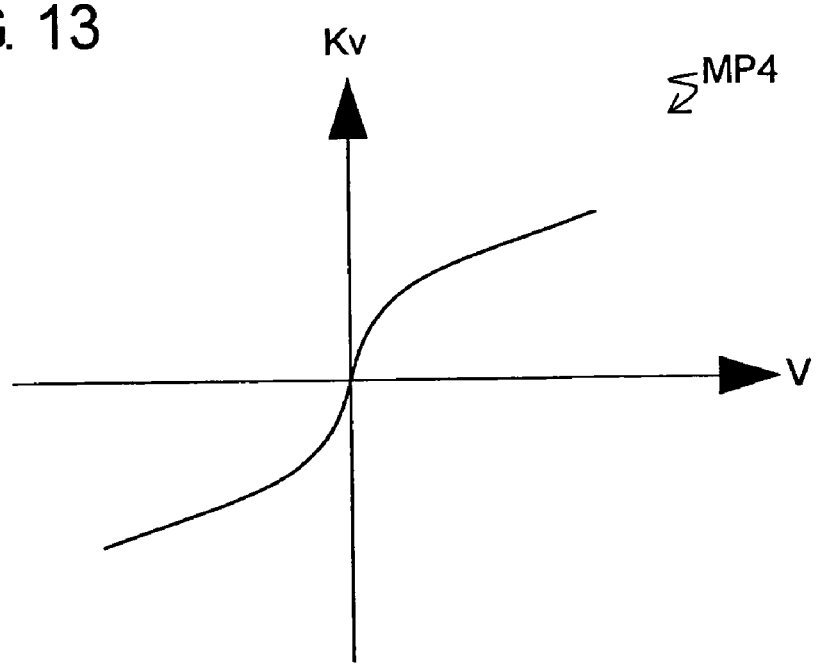
Figure 14:
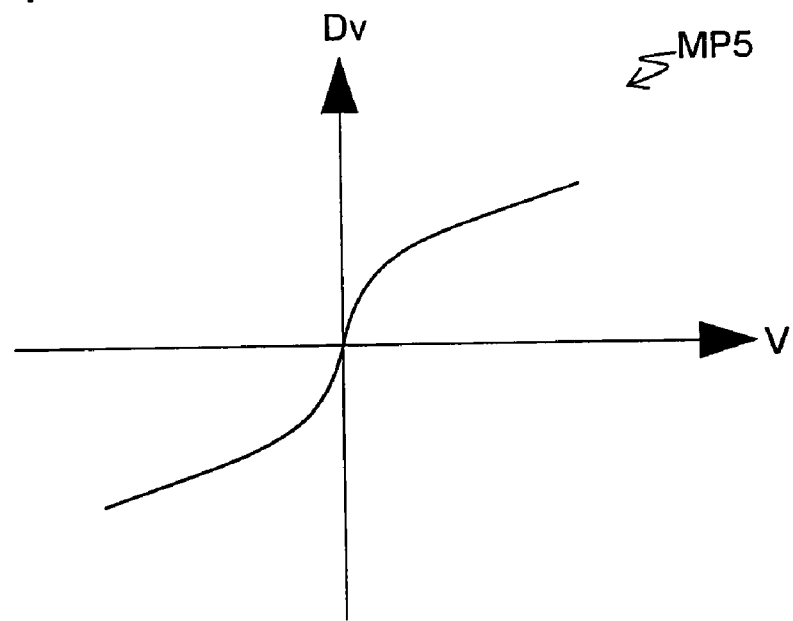
Figure 15:
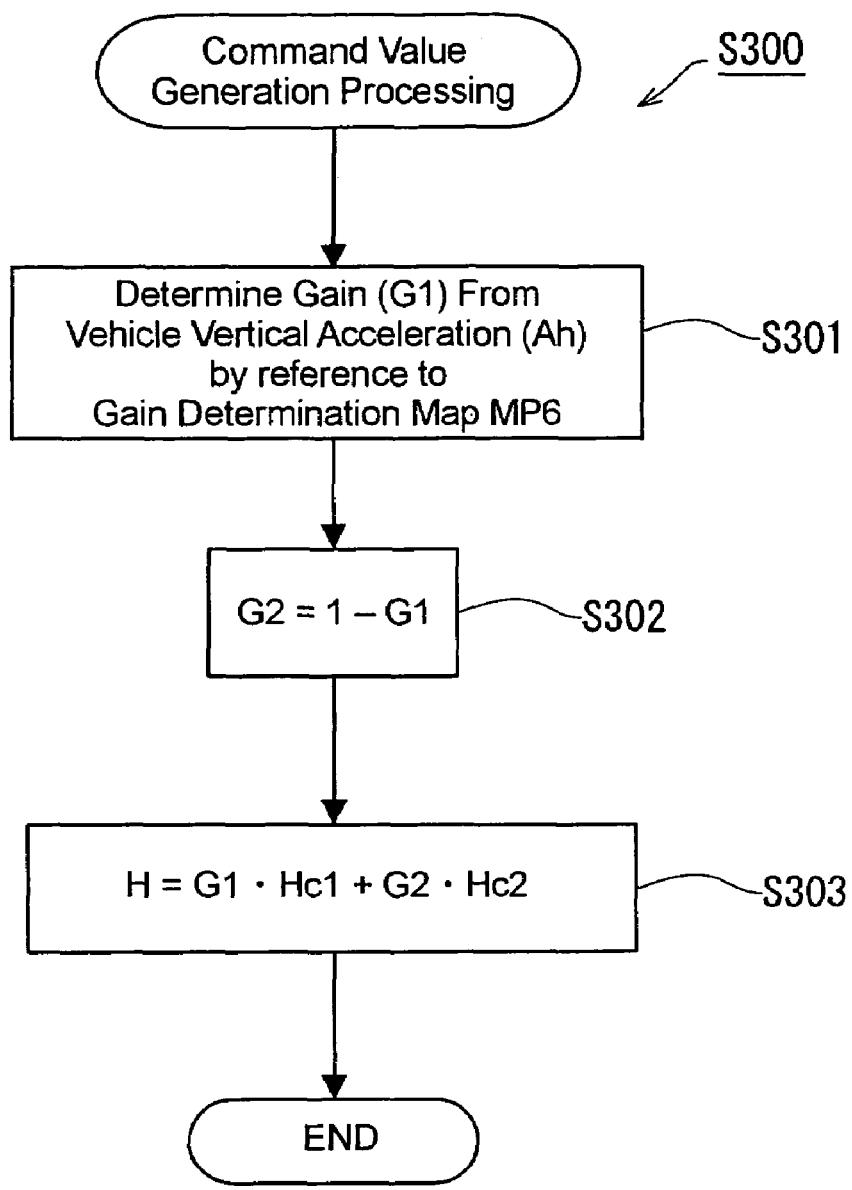
Figure 16:
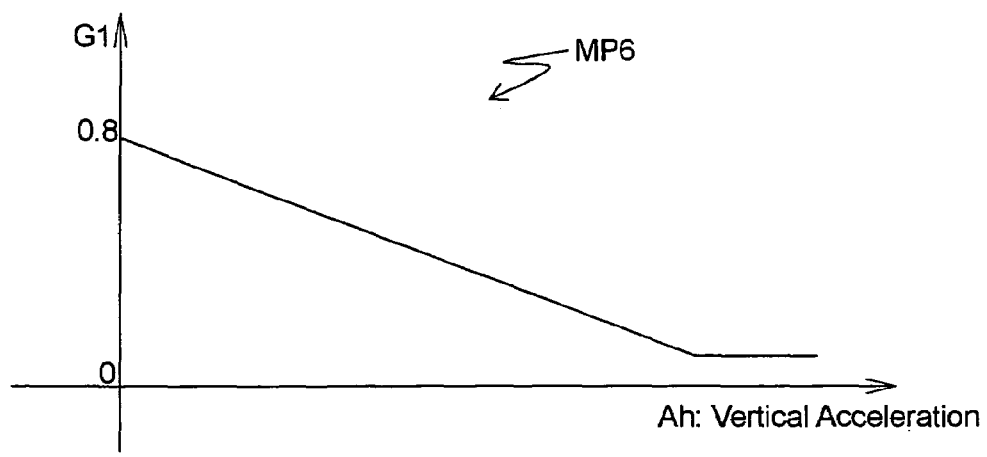
Figure 18:
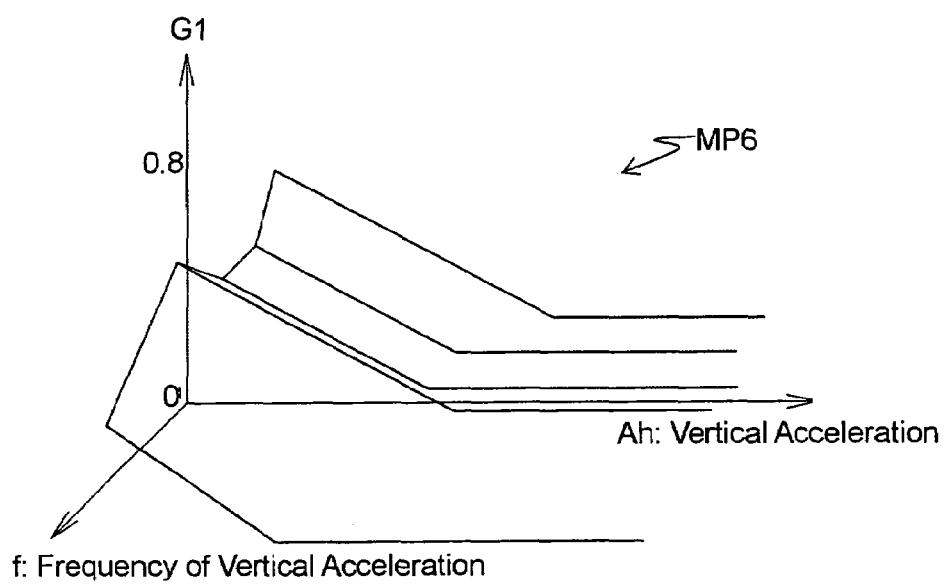
Figure 17:
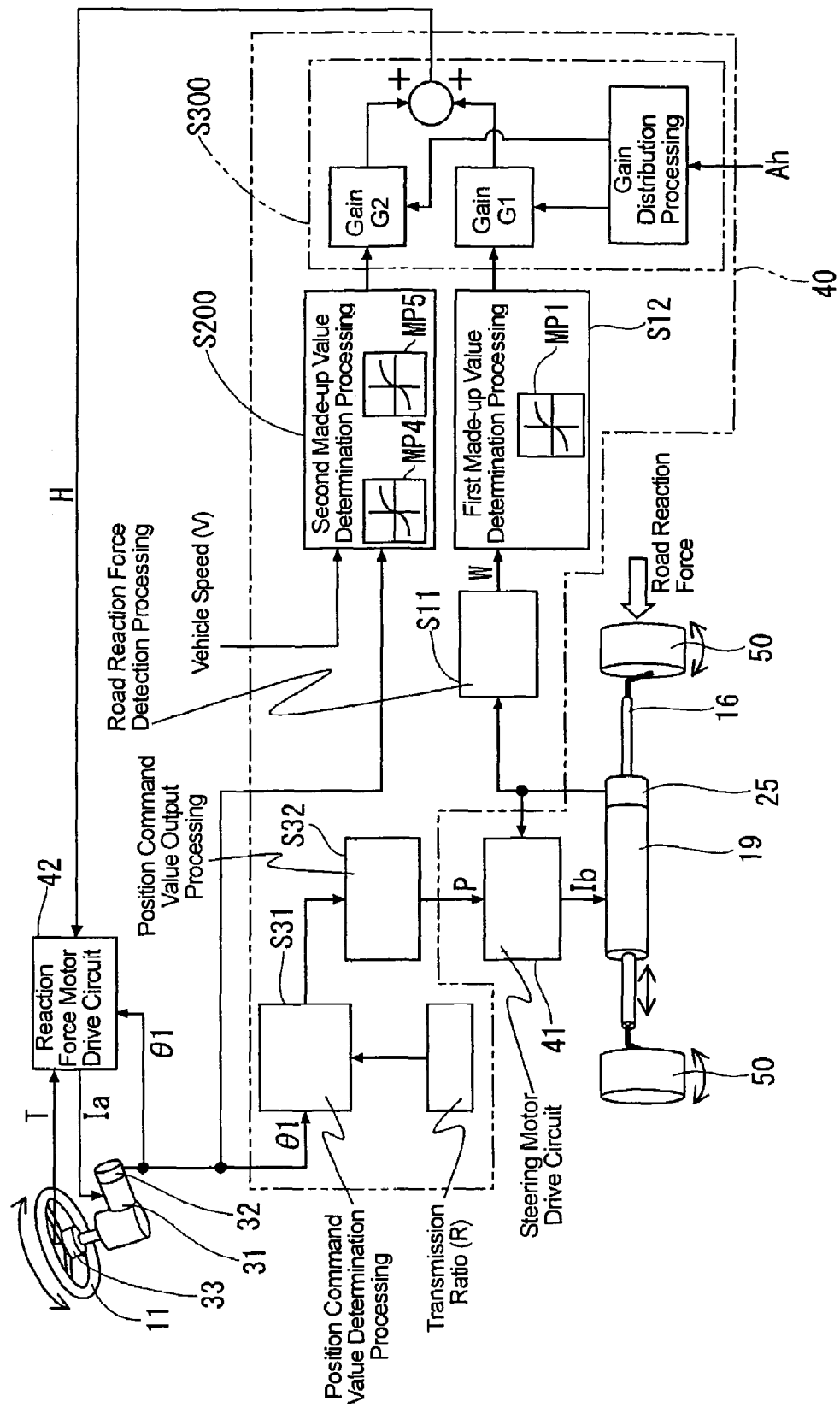

FIG. 11 a function block diagram showing the steer-by-wire system in the first embodiment realized by the execution of the steering system main program shown in FIG. 2;

FIG. 12 is a flow chart showing a second made-up valve determination processing in a second embodiment;

FIG. 13 is a conceptional chart representing a first coefficient determination map in the second embodiment;

FIG. 14 is a conceptional chart representing a second coefficient determination map in the second embodiment;

FIG. 15 is a flow chart showing a command value generation processing in the second embodiment;

FIG. 16 is a conceptional chart representing a gain determination map;

FIG. 17 a function block diagram showing the steer-by-wire system in the second embodiment realized by the execution of the steering system main program shown in FIG. 2; and FIG. 18 is a conceptional chart representing a frequency and acceleration dependent gain determination map.

DETAILED DESCRIPTION OF THE PREFERRED EMBODIMENTS

First Embodiment

Figure 1:
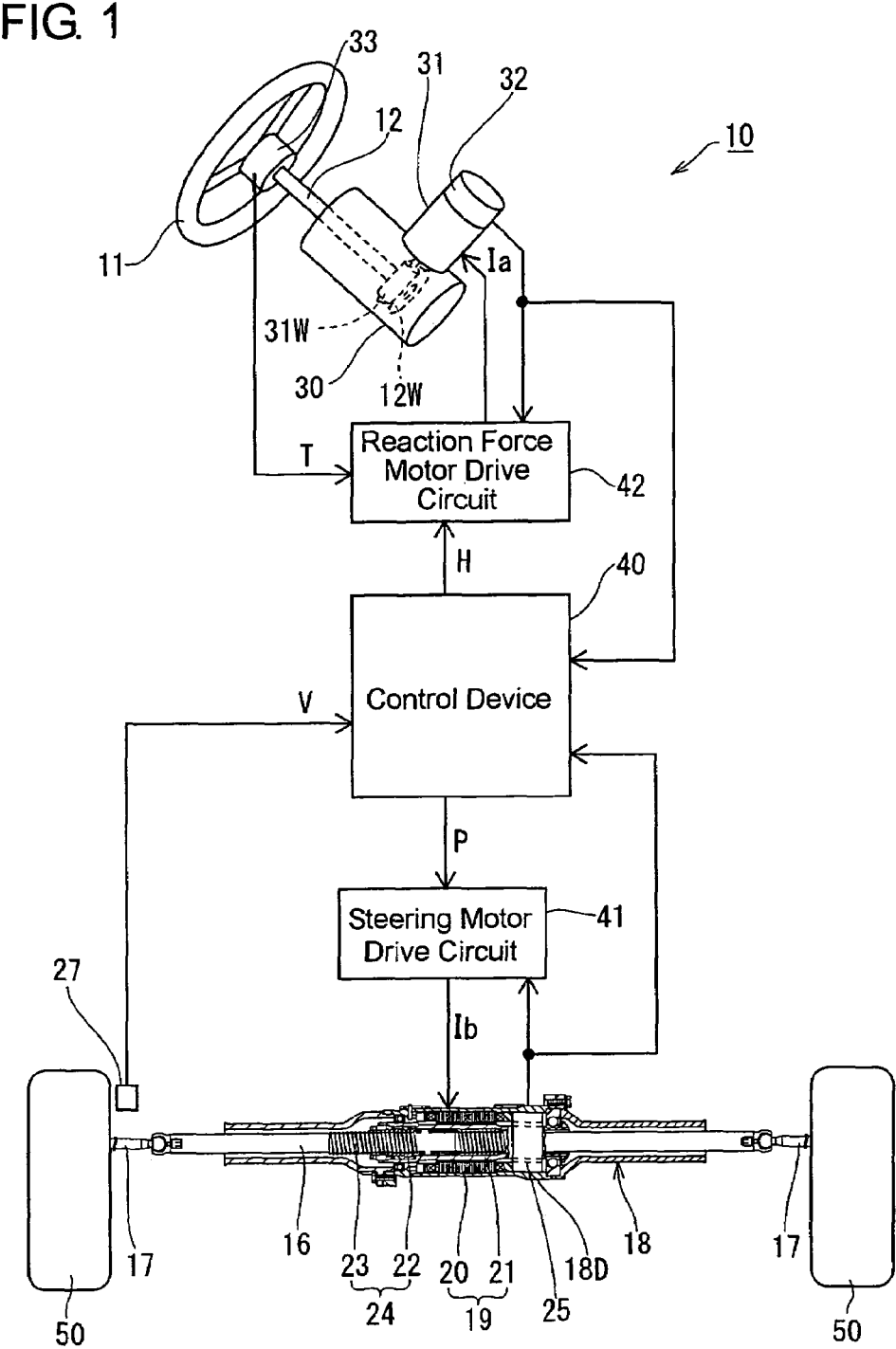
FIG. 1 is a schematic view of a steer-by-wire system in a first embodiment according to the present invention.

A first embodiment according to the present invention will be described hereafter with reference to FIGS. 1 to 11. FIG. 1 shows the entire construction of a steer-by-wire system 10 in the embodiment according to the present invention. In this steer-by-wire system 10, a steering handle 11 is mechanically disconnected from steerable wheels 50, 50. First of all, description will be made regarding components on the side of the steerable wheels 50, 50. An inter-steerable wheel shaft 16 is interposed between the pair of steerable wheels 50, 50, and tie rods 17 and 17 coupled to the opposite ends of the inter-steerable wheel shaft 16 are coupled respectively to the steerable wheels 50, 50.

The inter-steerable wheel shaft 16 passes through a cylindrical housing 18, which is secured to a body of a vehicle. A large-diameter section 18D is provided at an axially intermediate portion of the cylindrical housing 18, and a steering motor 19 is incorporated in the large-diameter section 18D. The steering motor 19 is composed of a stator 20 fixedly secured to the internal surface of the cylindrical housing 18 and a cylindrical rotor 21 inserted into the stator 20 to be rotatable freely, and the inter-steerable wheel shaft 16 passes through the rotor 21. Further, the rotor 21 is immovable in the axis direction. Further, at one end of the large-diameter section 18D of the cylindrical housing 18, there is provided a rotational position sensor (e.g., encoder) 25 for detecting the rotational position of the rotor 21.

A ball nut 22 is assembled to an internal surface of the rotor 21. A ball screw section 23 is formed at an axially intermediate portion of the inter-steerable wheel shaft 16. The ball nut 22 and the ball screw section 23 constitute a ball screw mechanism 24, which linearly moves the ball screw section 23 relative to the cylindrical housing 18 upon rotation of the ball nut 22 together with the rotor 21 thereby to steer the steerable wheels 50, 50. Vehicle speed sensors 27 (one only shown in FIG. 1) are provided to be close respectively to the steerable wheels 50, 50.

Next, description will be made regarding components on the side of the steering handle 11. An end of a steering shaft 12 extending from the center of the steering handle 11 enters inside a gear box 30, and a worm wheel 12W is secured to the one end of the steering shaft 12 within the gear Box 30. Further, a reaction force motor 31 is secured to the gear box 30, and a worm gear 31W is secured to one end of an output shaft of the reaction force motor 31. The worm gear 31W and the worm wheel 12W are in meshing with each other within the gear box 30. Thus, a reaction force against the manipulation of the steering handle 11 can be properly altered by the reaction force motor 31. Further, a torque sensor 33 for detecting a steering reaction force (T) being applied onto the steering handle 11 is provided at the other end of the steering shaft 12 on the side of the steering handle 11. In addition, the reaction force motor 31 is provided with a rotational position sensor 32 (e.g., encoder) for detecting the rotational position of the output shaft of the reaction force motor 31.

Next, description will be made regarding the control for the steer-by-wire system 10. This steer-by-wire system 10 is controllable by a control device 40. The control device 40 executes a control program PG1 shown in FIG. 2 at a predetermined time interval to generate a position command value (P) for driving the steering motor 19 and a steering reaction force command value (H) for driving the reaction force motor 31 and to output the command values (P) and (H) respectively to a steering motor drive circuit 41 and a reaction force motor drive circuit 42. Specifically, when executing the control program PG1, the control device 40 takes respective detection results of the vehicle speed sensors 27 and the rotational position sensors 25, 32 (step S1).

Then, the control device 40 converts the detection result of the rotational position sensor 25 of the steering motor 19 into a linear motion position (X) of the inter-steerable wheel shaft 16 and also converts the detection result of the rotational position of the reaction force motor 31 into a steering angle (θ1) of the steering handle 11 (step S2). The linear motion position (X) and the steering angle (θ1) are each regarded as a steering position. Each of the linear motion position (X) and the steering angle (θ1) indicates the value of "0" in the state that the steering handle 11 and the steerable wheels 50 are positioned at the neutral position (i.e., the state that the vehicle travels straight ahead) and indicates a value offset or deviated from the value of "0" in the state that the steering handle 11 and the steerable wheels 50 are away from the neutral position (i.e., the state that the vehicle is able to turn).

Figure 3:
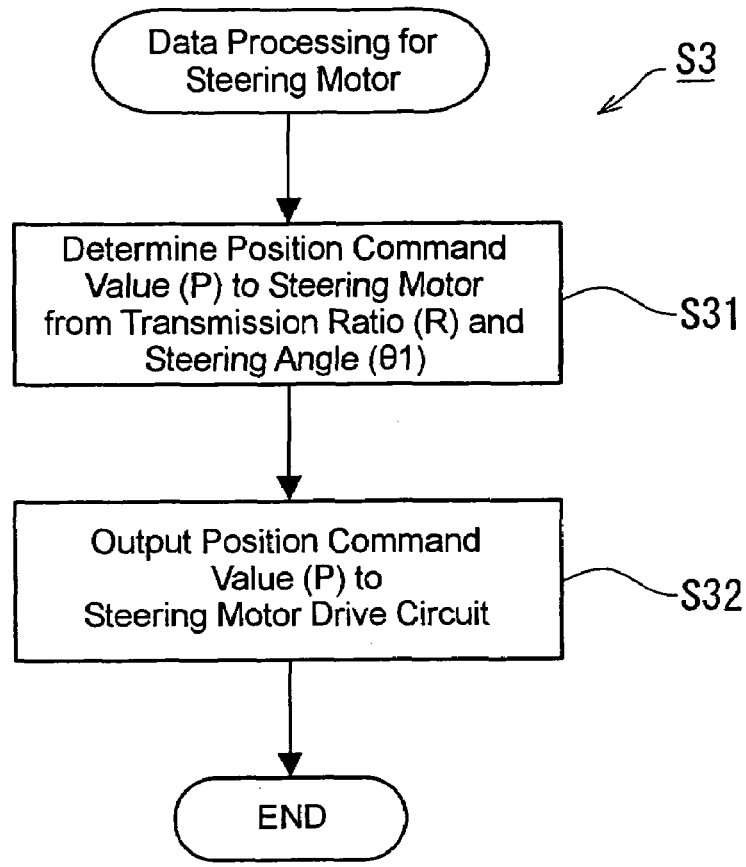
FIG. 3 is a flow chart showing a data processing for a steering motor.

Thereafter, the control device 40 executes a steering motor data processing (step S3). As shown in FIG. 3, at the steering motor data processing (step S3), the control device 40 obtains a target steering angel (θ2) of the steerable wheels 50 from a predetermined transmission ratio (R) and the steering angle (θ1) of the steering handle 11 by the calculation of an expression θ2=R·θ1 and determines a position command value (P) which is to be given to the steering motor 19 for making the steering angle of the steerable wheels 50 coincide with the target steering angel (θ2) (step S31). It is to be noted that the transmission ratio (R) is not required to be a constant value, but may be the value which is varied in dependence on the vehicle speed (V), as exemplified in the aforementioned Patent Document 3.

Then, the control device 40 outputs the position command value (P) to the steering motor drive circuit 41 (step S32). Thus, the steering motor drive circuit 41 (refer to FIG. 1) applies to the steering motor 19 a drive current (Ib) corresponding to the difference between the rotational position detected by the rotational position sensor 25 of the steering motor 19 and the position command value (P). As a consequence, the steerable wheels 50 are steered to the target steering angel (θ2).

Figure 4:
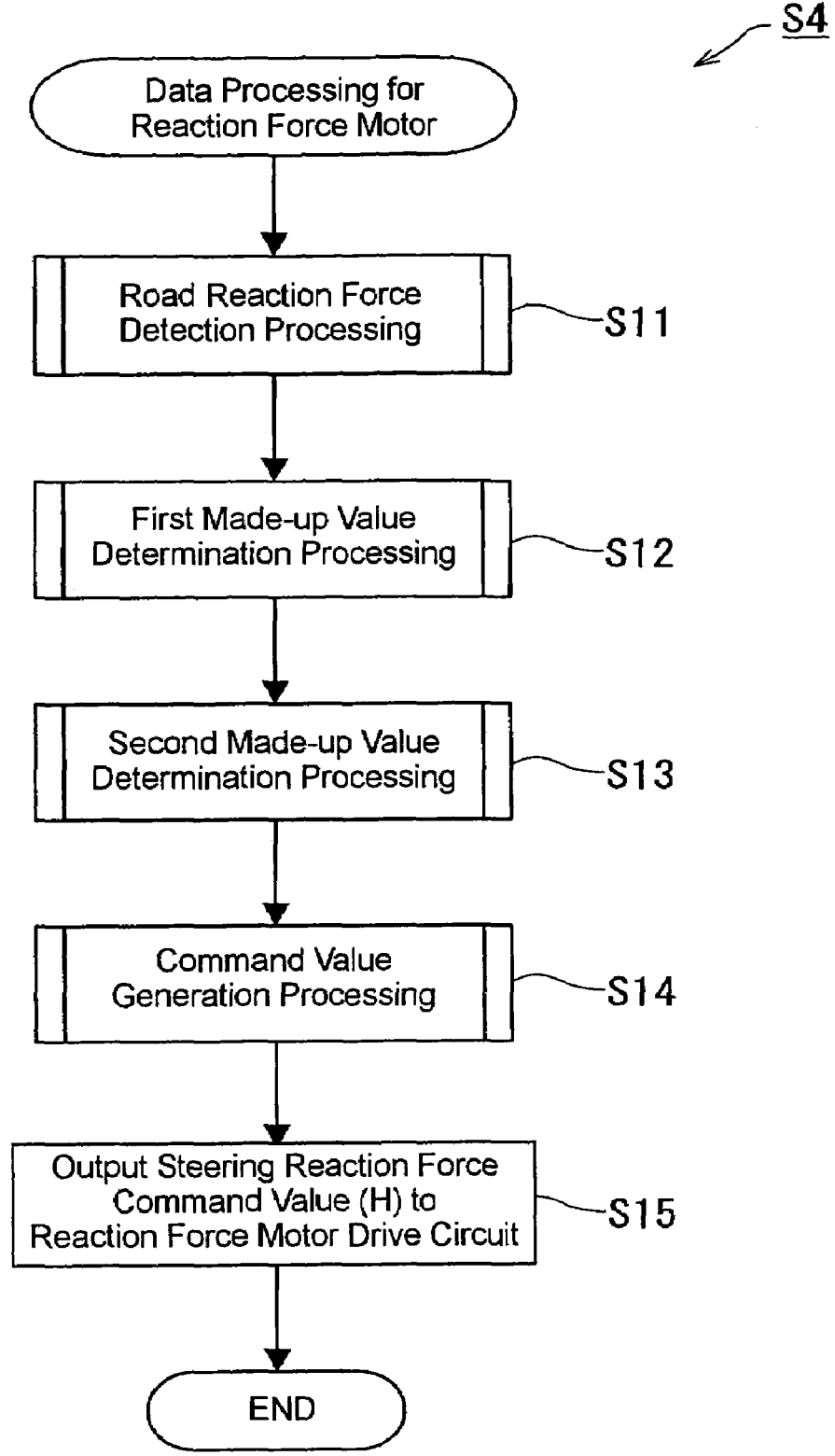
FIG. 4 is a flow chart showing a data processing for a reaction force motor.

Upon completion of the steering motor data processing (step S3), a reaction force motor data processing (step S4) is executed as shown in FIG. 2. At the reaction force motor data processing (step S4), as shown in FIG. 4, a road reaction force detection processing (step S11 which constitutes road reaction force detection means) is first executed for detecting a road reaction force. Herein, the term "road reaction force" means a reaction force which is exerted from the road surface against the steering of the steerable wheels 50 and can be detected as force acting on a component which moves in linkage with the steering operation of the steerable wheels 50. One example of such a component is the inter-steerable wheel shaft 16, and the road reaction force may be detected as the axial force acting on the inter-steerable wheel shaft 16. Therefore, an equation of motion for the force which is exerted on the inter-steerable wheel shaft 16 in the axial direction thereof is made as the following expression (1).

$$M \cdot (d^2x/dt^2) = u - (W - f2) \qquad (1)$$

In the above expression, symbol "M" denotes the mass of the inter-steerable wheel shaft 16, member "($d^2x/dt^2$)" represents a second derivative value of the linear motion position (X) differentiated twice with respect to time (hereafter referred to as "twice time-differentiated value of the linear motion position (X)), that is, the acceleration of the inter-steerable wheel shaft 16, symbol "u" represents the drive force of the steering motor 19 (hereafter referred simply as "motor drive force (u)"), symbol "W" represents road reaction force, and symbol "f2" represents mechanical friction force inherent to in the ball screw mechanism 24 and the like. Then, at the road reaction force detection processing (step S11), the control device 40 calculates the motor drive force (u) and the acceleration ($d^2x/dt^2$) based on the linear motion position (X) of the inter-steerable wheel shaft 16 and calculates the difference (W2=W−f2) between the road reaction force (W) and the friction force (f2) by substituting the value of the mass (M) as a predetermined constant into the foregoing expression (1). Hereinafter, symbol "W2" is referred to as a "road reaction force inference value".

Figure 5:
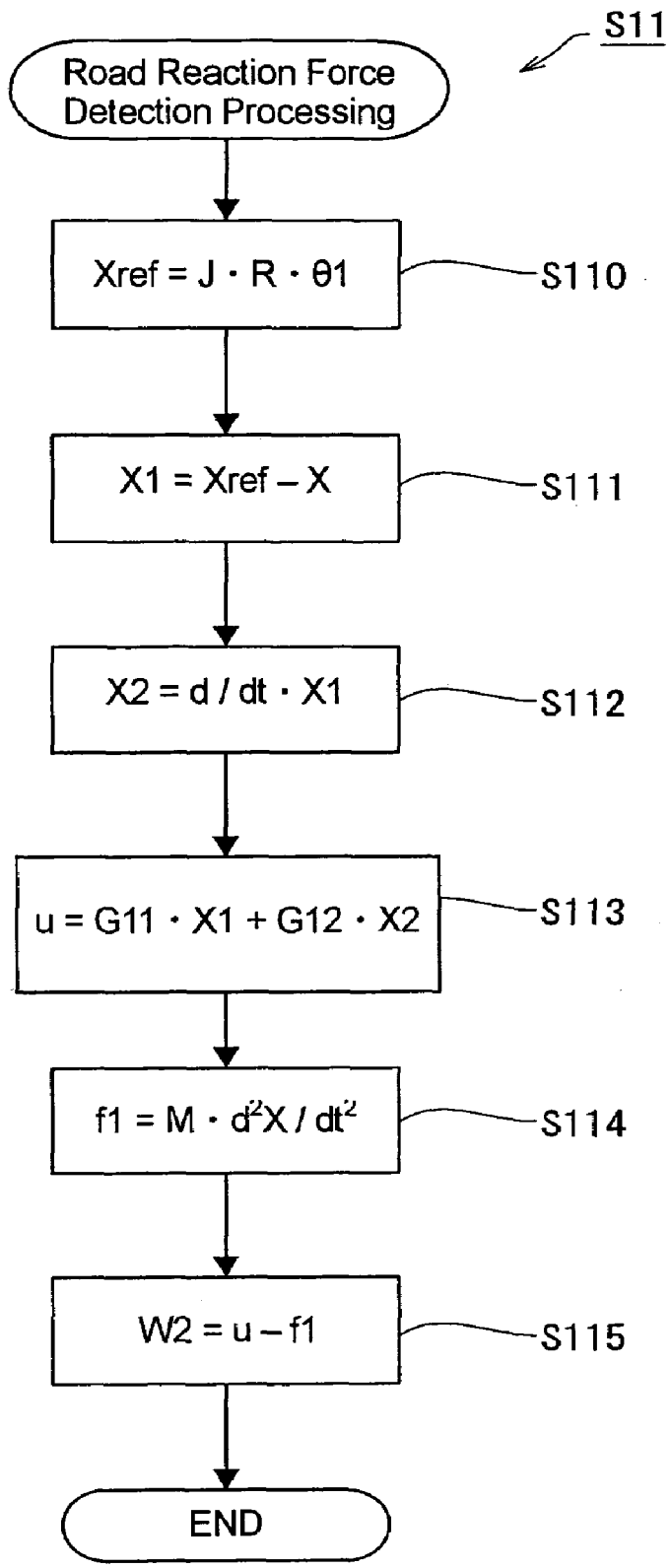
FIG. 5 is a flow chart showing a road reaction force detection processing.

Specifically, as shown in FIG. 5, when executing the road reaction force detection processing (step S11), the control device 40 obtains a target linear motion position (Xref) of the inter-steerable wheel shaft 16 by multiplying the steering angle (θ1), the transmission ratio (R) and a predetermined data conversion coefficient (J) (step S110). Then, the control device 40 obtains the position difference (X1) between the linear motion position (X) and the target linear motion position (Xref) (step S111) and further obtains a first derivative value (X2) of the position difference (X1) differentiated with respect to time (hereafter referred to as "time-differentiated value (X2) of the position difference (X1)") (step S112). Thereafter, the control device 40 obtains as the motor drive force (u) the sum of a product of the position difference (X1) multiplied by a predetermined constant (G11) and another product of the time-differentiated value (X2) multiplied by another predetermined constant (G12) (step S113).

Subsequently, the control device 40 obtains an inertia force (f1) by multiplying the acceleration ($d^2x/dt^2$) being the twice time-differentiated value of the linear motion position (X), by the mass "M" of the inter-steerable wheel shaft 16 (step S114). Then, the control device 40 obtains the road reaction force inference value (W2) by subtracting the inertia force (f1) from the motor drive force (u) in accordance with the foregoing expression (1).

Figure 6:
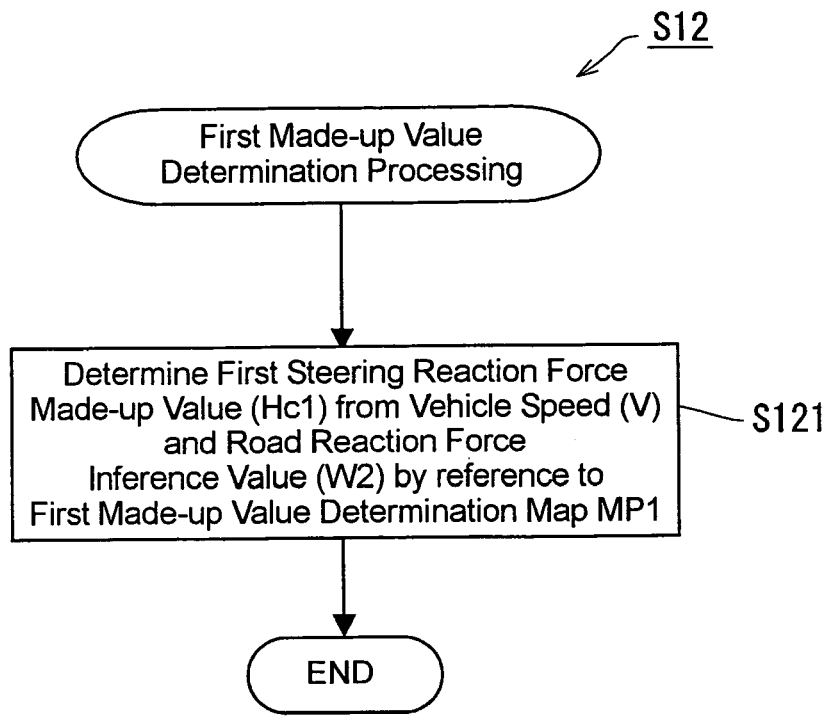
FIG. 6 is a flow chart showing a first made-up valve determination processing.
Figure 7:
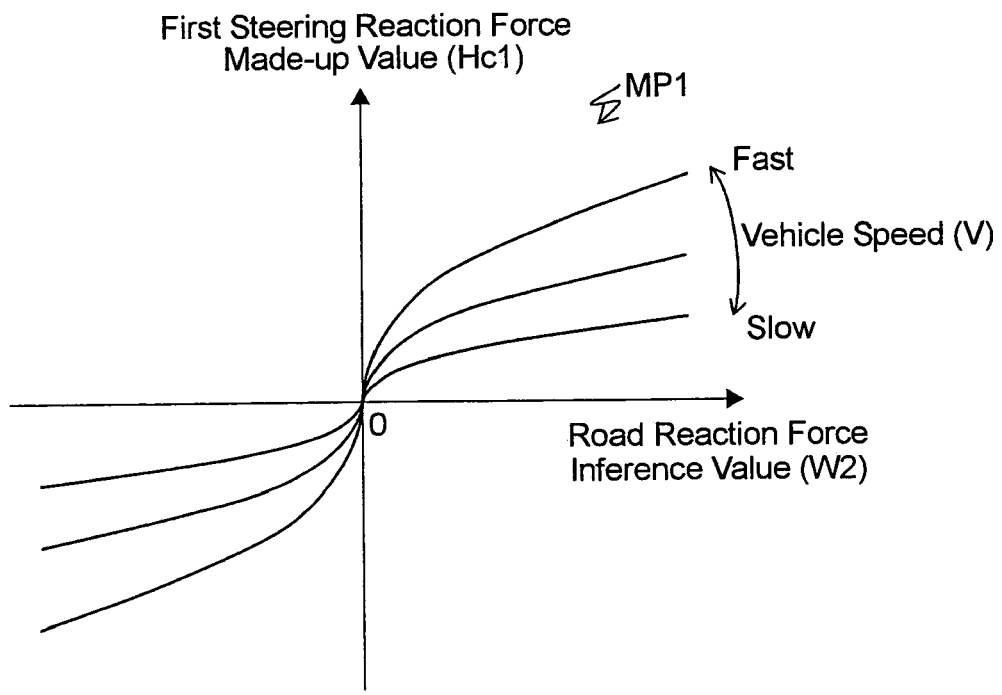
FIG. 7 is a conceptional chart representing a first made-up value determination map.

A first made-up value determination processing (step S12 which constitutes first made-up value determination means) is executed upon completion of the road reaction force detection processing (step S11), as shown in FIG. 4. Thus, as shown in FIG. 6, reference is made to a first made-up value determination map MP1 (refer to FIG. 7) to determine a first steering reaction force made-up value (Hc1) from the vehicle speed (V) and the road reaction force inference value (W2) (step S121). As shown in FIG. 7, in the first made-up value determination map MP1, the road reaction force inference value (W2) and the first steering reaction force made-up value (Hc1) are stored in correspondence to each other for each of various vehicle speeds (V). The first steering reaction force made-up value (Hc1) corresponding to the road reaction force inference value (W2) is set to increase as the vehicle speed (V) increases. Further, at each of the vehicle speeds (V), the first steering reaction force made-up value (Hc1) is set to increase as the road reaction force inference value (W2) increases.

Figure 8:
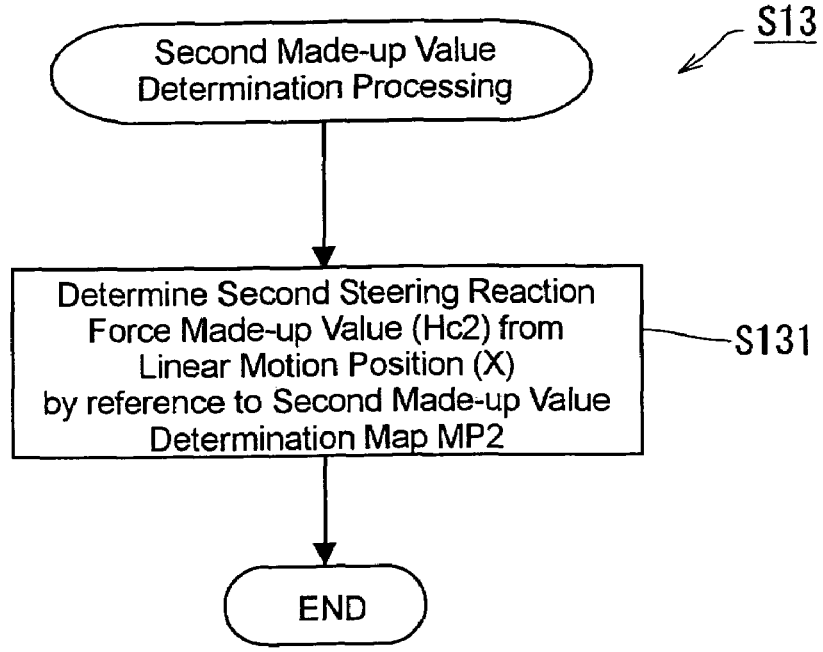
FIG. 8 is a flow chart showing a second made-up valve determination processing.
Figure 9:
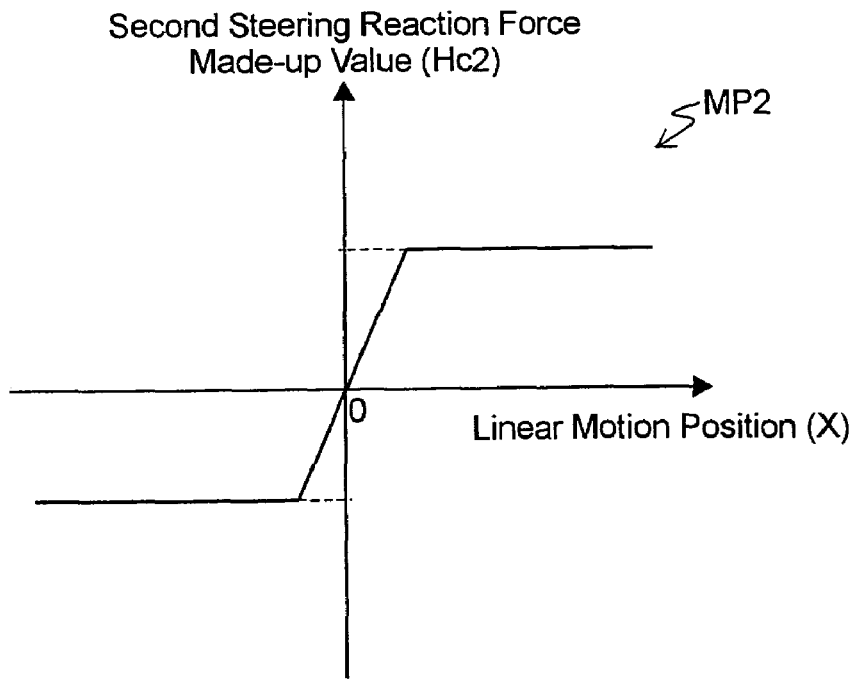
FIG. 9 is a conceptional chart representing a second made-up value determination map.

A second made-up value determination processing (step S13 which constitutes second made-up value determination means) is executed upon completion of the first made-up value determination processing (step S12), as shown in FIG. 4. When the second made-up value determination processing (step S13) is executed, as shown in FIG. 8, a second steering reaction force made-up value (Hc2) is determined from the linear motion position (X) of the inter-steerable wheel shaft 16 by reference to a second made-up value determination map MP2 (refer to FIG. 9) (step S131). As shown in FIG. 9, the second made-up value determination map MP2 has the linear motion position (X) and the second steering reaction force made-up value (Hc2) stored to correspond to each other. The second made-up value determination map MP2 is set so that the second steering reaction force made-up value (Hc2) varies in proportion to the variation of the linear motion position (X) around the zero point of the linear motion position (X) that is, around the neutral position of the steering handle 11 and the steerable wheels 50, but the second steering reaction force made-up value (Hc2) is kept to be a predetermined uppermost value, which is slightly larger than a steering torque conversion value (Tf2) of the mechanical train friction force (f2), when the absolute value of the linear motion position (X) becomes larger than a predetermined value.

Figure 10:
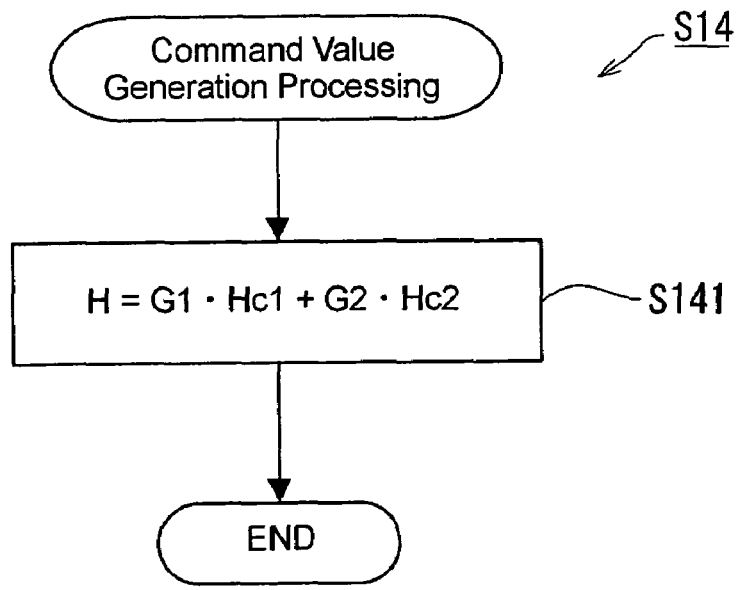
FIG. 10 is a flow chart showing a command value generation processing.

A command value generation processing (step S14 which constitutes command value generation means) is executed upon completion of the second made-up value determination processing (step S13), as shown in FIG. 4. Thus, as shown in FIG. 10 and as represented by the following expression (2), a steering reaction force command value (H) is calculated as the sum of a product of the first steering reaction force made-up value (Hc1) multiplied by a first gain (G1) and another product of the second steering reaction force made-up value (Hc2) multiplied by a second gain (G2) (step S141).

$$H = G1 \cdot Hc1 + G2 \cdot Hc2 \tag{2}$$

Specifically, in the present embodiment, since a setting is made for G1=G2=1, the steering reaction force command value (H) is calculated simply as the sum of the first steering reaction force made-up value (Hc1) and the second steering reaction force made-up value (Hc2). Upon completion of the command value generation processing (step S14), the steering reaction force command value (H) is output to the reaction force motor drive circuit 42 (step S15), as shown in FIG. 4. Thus, the reaction force motor drive circuit 42 (refer to FIG. 1) applies to the reaction force motor 31 a drive current (Ia) corresponding to the steering reaction force command value (H), whereby a proper steering reaction force is applied to the steering handle 11. Further, the reaction force motor drive circuit 42 performs a feedback control so that the torque (T) detected by the torque sensor 33 comes into coincidence with the steering reaction force command value (H).

The description regarding the control program PG1 is as aforementioned. It is to be noted that by executing the control program PG1, the present embodiment operates as if it constituted a control system whose function block diagram is shown in FIG. 11. Therefore, the system 10 having been described specifically with reference to FIGS. 1 to 10 is the same as, or equivalent to, the control system shown in FIG. 11 and may be constituted in the form of a gather of hard-wired function components shown in FIG. 11.

Next, description will be made regarding the effects of the present embodiment. In the steer-by-wire system 10 in the present embodiment, like the steering system for the conventional vehicles, the steering handle 11 is given a steering reaction force reflecting the road reaction force which is derived from the first steering reaction force made-up value (Hc1) determined based on the road reaction force inference value (W2). On the other hand, as shown in FIG. 9, the second steering reaction force made-up value (Hc2) determined in dependence on the linear motion position (X) of the intersteerable wheel shaft 16 is "0" when the linear motion position (X) is on the neutral position, that is, when the steering handle 11 and the steerable wheels 50 are on the neutral position. The second steering reaction force made-up value (Hc2) increases in proportion to the moving distance of the linear motion position (X) away from the neutral position when the linear motion position (X) is around the neutral position, and is kept to be the predetermined uppermost value, which is slightly larger than the steering torque conversion value (Tf2) of the mechanical train friction force (f2), when the absolute value of the linear motion position (X) becomes larger than the predetermined value. Therefore, the mechanical train friction force (f2) of the ball screw mechanism 24 or the like can be cancelled by that derived from the second steering reaction force made-up value (Hc2), so that a good returning of the steering handle 11 can be realized.

As described above, according to the steer-by-wire system 10 in the present embodiment, the steering reaction force of the same level as that in the steering system for the conventional vehicles can be given based on the first steering reaction force made-up value (Hc1) determined based on the road reaction force inference value (W2). At the same time, a good returning of the steering handle 11 can be realized by canceling the mechanical train friction force (f2) of the ball screw mechanism 24 or the like by that derived from the second steering reaction force made-up value (Hc2), which is determined in dependence on a substitution value (the linear motion position (X)) for the steering position and which becomes a constant value when the absolute value of the linear motion position (X) becomes larger than the predetermined value, without loosing the steering feeling which is of the same level as that in the steering system for the conventional vehicles and which is derived from the first steering reaction force made-up value (Hc1).

Second Embodiment

FIGS. 12 to 17 show the second embodiment, which differs from the foregoing first embodiment in the constructions of a second made-up value determination processing (step S200) and a command value generation processing (step S300). Hereinafter, description will be made only regarding the constructions different from those in the first embodiment.

As shown in FIG. 12, when the second made-up value determination processing (step S200) in the second embodiment is executed, a first coefficient (Kv) is determined from the vehicle speed (V) by reference to a first coefficient determination map MP4 (refer to FIG. 13). Then, a second coefficient (Dv) is determined from the vehicle speed (V) by reference to a second coefficient determination map MP5 (refer to FIG. 14).

The first coefficient determination map MP4 is set so that the first coefficient (Kv) increases as the vehicle speed (V) increases, as shown in FIG. 13. Likewise, the second coefficient determination map MP5 is set so that the second coefficient (Dv) also increases as the vehicle speed (V) increases, as shown in FIG. 14. Then, as represented by the following expression (3), the second steering reaction force made-up value (Hc2) is calculated as the sum of a product of the steering angle (θ1) of the steering handle 11 multiplied by the first coefficient (Kv) and another product of a time-differentiated value (ω) of the steering angle (θ1) multiplied by the second coefficient (Dv) (step S203).

$$Hc2 = Kv \cdot \theta 1 + Dv \cdot \omega \tag{3}$$

Further, in the present embodiment, when the command generation processing (step S300) is executed, as shown in FIG. 15, a first gain (G1) is determined from a vertical acceleration (i.e., the acceleration in the vertical direction) (Ah) of the vehicle by reference to a gain determination map MP6 (refer to FIG. 16) (step S301). In the present embodiment, the vertical acceleration (Ah) of the vehicle is actually measured by an acceleration pickup (not shown) provided on the vehicle and is taken into the control device 40.

Then, a second gain (G2=1−G1) is calculated by subtracting the first gain (G1) from a constant "1" (step S302). Thereafter, as represented by the following expression (4), the steering reaction force command value (H) is calculated by the sum of a product of the first steering reaction force made-up value (Hc1) multiplied by the first gain (G1) and another product of the second steering reaction force made-up value (Hc2) multiplied by the second gain (G2) (step S303).

$$H = G1 \cdot Hc1 + G2 \cdot Hc2 \tag{4}$$

The differences of the present embodiment from the foregoing first embodiment are as aforementioned. It is to be noted that by executing the control programs shown in FIGS. 12 and 15, the present embodiment operates as if it constituted a control system whose function block diagram is shown in FIG. 17. Therefore, the system 10 which is modified from the foregoing first embodiment to execute the second mode-up value determination processing shown in FIG. 12 and the command value generation processing shown in FIG. 15 is the same as, or equivalent to, the control system shown in FIG. 17 and may be constituted in the form of a gather of hard-wired function components shown in FIG. 17.

Next, description will be made regarding the effects of the second embodiment. In the steer-by-wire system 10 in the second embodiment, the steering feeling can be adjusted by properly altering the weightings on the first steering reaction force made-up value (Hc1) and the second steering reaction force made-up value (Hc2) in generating the steering reaction force command value (H) from the first steering reaction force made-up value (Hc1) and the second steering reaction force made-up value (Hc2). More specifically, for example, when the vertical acceleration (Ah) of the vehicle is large as is the case of traveling on an unpaved or dirt road, the first gain (G1) is made to be smaller to make smaller the weighting of the first gain (G1) on the first steering reaction force made-up value (Hc1) (the value determined in dependence on the road reaction force inference value (W2)) which controls the steering reaction force command value (H). As a result, the vibration caused by bumps on the unpaved road is restricted from being reflected on the steering reaction force command value (H), and the vibration is made to be hardly conveyed to the driver through the steering handle 11, so that it becomes possible to provide a pleasant steering feeling.

Further, in the second embodiment, the time-differentiated value ($\omega$) of the steering angle ($\theta1$) is included into the second steering reaction force made-up value (Hc2), and this provides a dumping effect to suppress the resilient motion of the steering handle 11, so that stability can be given to the steering feeling.

In addition, the first and second coefficients (Kv, Dv) which increase with the increase of the vehicle speed (V) are included into the second steering reaction force made-up value (Hc2), and this makes the second steering reaction force made-up value (Hc2) vary also in dependence on the vehicle speed (V). That is, not only the first steering reaction force made-up value (Hc1) but also the second steering reaction force made-up value (Hc2) is made to vary in dependence on the vehicle speed (V). Thus, at any vehicle speed, the decrease in one of the steering reaction force made-up values (Hc1 or Hc2) can be properly compensated by the other steering reaction force made-up value (Hc2 or Hc1) even where the ratio of the weighting gains (G1, G2) for the first steering reaction force made-up value (Hc1) and the second steering reaction force made-up value (Hc2) is altered in dependence on the state of the road surface, so that a better adjustment can be done for the steering feeling.

Other Embodiments

The present invention is not limited to the foregoing embodiments. For example, embodiments as described hereinafter are also encompassed within the technological scope of the present invention.

(1) Although in the foregoing first embodiment, the road reaction force inference value (W2) is detected based on the position deviation of the inter-steerable wheel shaft 16 from the neutral position or the like, a road reaction force compensation value (W3≈W) may alternatively be detected by the calculation of W3=W2+f3 using a friction force representing value (f3≈f2) which can be experimentally obtained from measured results of the mechanical train friction inherent to the ball screw mechanism 24 or the like. Further, the road reaction force (W) may be directly detected by the use of an axis force sensor which is attached to the inter-steerable wheel shaft 16. Furthermore, the road reaction force (W) may be detected by another method which uses a disturbance observer as described in, e.g., the aforementioned Patent Document 3, paragraphs 0046 to 0057. Alternatively, the drive current (Ib) applied to the steering motor 19 shown in FIG. 1 may be utilized as an alternative value for the road reaction force (W). In this case, the first steering reaction force made-up value (Hc1) may be determined from the drive current (Ib) to the steering motor 19 by reference to a predetermined map (not shown).

(2) Instead of the ball screw mechanism 24 in the foregoing first embodiment, a rack-and-pinion mechanism may be used to convert the output rotation of the steering motor 19 into the steering motion of the steerable wheels 50.

(3) Although in the foregoing second embodiment, the second steering reaction force made-up value (Hc2) is calculated from the steering angle ($\theta1$) of the steering handle 11 and the time-differentiated value ($\omega$) of the steering angle ($\theta1$) as represented by the aforementioned expression (3), there may be taken an alternative construction that calculates the second steering reaction force made-up value (Hc2) from the linear motion position (X) of the inter-steerable wheel shaft 16, the time-differentiated value (dX/dt) of the linear motion position (X) and predetermined scale conversion coefficients (q1, q2), as represented by the following expression (5). Further, the second steering reaction force made-up value (Hc2) may be calculated from the steering angle ($\theta1$), the time-differentiated value (dX/dt) of the linear motion position (X) and a predetermined scale conversion coefficient (q2), as represented by the following expression (6). Furthermore, the second steering reaction force made-up value (Hc2) may be calculated from the linear motion position (X), the time-differentiated value ($\omega$) of the steering angle ($\theta1$) and a predetermined scale conversion coefficient (q1), as represented by the following expression (7).

$$Hc2 = Kv \cdot q1 \cdot X + Dv \cdot q2 \cdot (dX/dt) \tag{5}$$

$$Hc2 = Kv \cdot \theta1 + Dv \cdot q2 \cdot (dX/dt) \tag{6}$$

$$Hc2 = Kv \cdot q1 \cdot X + Dv \cdot \omega \tag{7}$$

(4) Although in the foregoing second embodiment, the first gain (G1) is determined in dependence on the vertical acceleration (Ah) of the vehicle, there may be taken a construction that the first gain (G1) is determined in dependence on the movement of a suspension of the vehicle.

(5) Although in the foregoing second embodiment, the first gain (G1) is set to be made smaller as the vertical acceleration (Ah) of the vehicle increases, the first gain (G1) is set to be made larger as the vertical acceleration (Ah) of the vehicle increases. With this construction, since the weighting on the first steering reaction force made-up value (Hc1: the value determined in dependence on the road reaction force) which controls the steering reaction force command value (H) becomes large during the traveling on a very bumpy road, it can be realized to convey bump-related information to the driver through the steering handle 11.

(6) Although in the foregoing second embodiment, the first gain (G1) is determined in dependence on the vertical acceleration (Ah) of the vehicle, there may be taken a construction that a map is provided as shown in FIG. 18 for determining the correlation of the acceleration (Ah) with the first gain (G1) with respect to each of various frequencies (f) of the vibration in the vertical direction, so that the first gain (G1) can be determined in dependence on both of the frequency (f) and the acceleration (Ah).

Finally, various features and many of the attendant advantages in the foregoing embodiments will be summarized as follows:

In the forgoing first embodiment typically shown in FIGS. 1 and 4-10, the steering reaction force command value (H) is generated from both of the first steering reaction force made-up value (Hc1) determined in dependence on the road reaction force (W) and the second steering reaction force made-up value (Hc2) determined in dependence on the steering position (X) of the steering handle 11 or the steerable wheels 50 wherein the values (Hc1, Hc2) are weighted by the respective weighting gains (G1, G2). Thus, since the steering reaction force directly corresponding to the road reaction force (W) is given after being weighted by the weighting gain (G1), it becomes possible to properly convey to the driver the information about state of the road surface represented by the road reaction force (W) and to return the steering handle 11 by the function of the second steering reaction force made-up value (Hc2) without suffering the influence of friction. Further, since the information about the state of the road surface represented by the road reaction force (W) is adjustable by the gain (G1) in the quantity to be conveyed, it can be easily realized to make the gain (G1) larger if the quantity to be conveyed is desired to be increased, or to make the gain (G1) smaller if the quantity to be conveyed is desired to be decreased in order to make the steering handle 11 insensitive to the road surface.

Also in the forgoing first embodiment typically shown in FIG. 10, the steering reaction force command value (H) is composed to take a main component of the steering reaction force which directly corresponds to the road reaction force (W) represented by the first steering reaction force made-up value (Hc1) and to make the second steering reaction force made-up value (Hc2) play the role of giving the minimum steering reaction force necessary to perform the smooth returning of the steering handle 11. Thus, it can be realized to obtain the steering feeling of the same level as that in the conventional vehicles wherein the steering reaction force directly corresponding to the road reaction force (W) is taken as the main component with the good returning of the steering handle 11 being secured.

Also in the forgoing first embodiment typically shown in FIG. 10, it can be realized to take the construction that the ratio in weighting the gains (G1, G2) on the first and second steering reaction force made-up values (Hc1, Hc2) can be properly altered in dependence on the behavior of the vehicle or the state of the road surface.

In the foregoing second embodiment typically shown in FIGS. 15 and 16, the first gain (G1) is made smaller when the vertical acceleration (Ah) of the vehicle or the movement of the suspension becomes large, and this results in diminishing the weighting on the first steering reaction force made-up value (Hc1) (the value determined in dependence on the road reaction force (W)) of the steering reaction force command value (H). Thus, the vibration caused by the bumps on the road surface is suppressed not to be reflected on the steering reaction force command value (H) and is made to be hardly conveyed to the driver through the steering handle 11, so that it can be realized to give the driver a pleasant steering feeling.

Also in the foregoing second embodiment, it is possible to make the first gain (G1) become larger when the vertical acceleration (Ah) of the vehicle or the movement of the suspension becomes large, in which modified case the weighting is made larger on the first steering reaction force made-up value (Hc1) (the value determined in dependence on the road reaction force (W)) of the steering reaction force command value (H). Thus, it can be realized to convey the information about the bumps on the road surface to the driver through steering handle 11.

Also in the foregoing embodiments, the steering position detection means for detecting the steering position can be taken as the means 32 or 25 for detecting as the steering position the steering angle (θ1) of the steering handle 11 or the steerable wheels 50 or can be taken as the means for detecting as the steering position as the linear motion position (X) of the inter-steerable wheel shaft 16 which is interposed between the pair of steerable wheels 50.

Also in the foregoing embodiments, by utilizing the steering position (X) and the time-differentiated value (dX/dt) of the steering position (X), or by utilizing the steering position (X) and the vehicle speed (V), or by utilizing the steering position (X), the time-differentiated value (dX/dt) of the steering position (X) and the vehicle speed (V), it becomes possible to set the second steering reaction force made-up value (Hc2) finely in dependence on not only the steering position (X) but also the state of the steering manipulation by the driver or the traveling state of the vehicle. Where a steering reaction component (G1·Hc1) relying on the first steering reaction force made-up value (Hc1) is suppressed to be small by the adjustment of the gain (G1), it can be realized to give the driver a proper steering reaction force.

Obviously, numerous further modifications and variations of the present invention are possible in light of the above teachings. It is therefore to be understood that within the scope of the appended claims, the present invention may be practiced otherwise than as specifically described herein.

What is claimed is:

1. A steer-by-wire system comprising:
a steering handle disconnected mechanically from a pair of steerable wheels;
a steering motor for steering the steerable wheels in dependence on the manipulation of the steering handle;
a reaction force motor for generating a steering reaction force against the manipulation of the steering handle;
road reaction force detection means for detecting a road reaction force acting on the steerable wheels;
first made-up value determination means for determining a first steering reaction force made-up value (Hc1) in dependence on the road reaction force detected by the road reaction force detection means;
steering position detection means for detecting the steering position of the steering handle or the steerable wheels away from a neutral position;
second made-up value determination means for determining a second steering reaction force made-up value (Hc2) in dependence on the steering position detected by the steering position detection means; and
command value generation means for determining first and second gains (G1, G2) so that relations G1≦C, G2≦C and G1+G2=C can be satisfied where symbols G1, G2 and C are taken respectively as first gain, second gain and predetermined constant, and for generating a steering reaction command value (H) which makes the reaction force motor generate the steering reaction force, by the following expression:

$$H = G1 \cdot Hc1 + G2 \cdot Hc2$$

using the first and second gains (G1, G2).

2. The steer-by-wire system as set forth in claim 1, wherein:
the second steering reaction force made-up value (Hc2) is kept to be a constant value where the steering position exceeds a predetermined value; and
the command value generation means sets the first and second grains (G1, G2) to a relation of G1=G2=1 and generates the steering reaction command value (H) by the following expression:

$$H = Hc1 + Hc2$$

using the first and second steering reaction force made-up values (Hc1, Hc2).

3. The steer-by-wire system as set forth in claim 1, wherein:
the command value generation means is constructed to alter the first and second gains (G1, G2) in dependence on the behavior of the vehicle or the state of the road surface.

4. The steer-by-wire system as set forth in claim 1, further comprising:
vehicle behavior detection means for detecting a vertical acceleration of the vehicle or the movement of a suspension provided on the vehicle; and wherein:
the command value generation means is constructed to make the first gain (G1) smaller as the vertical acceleration of the vehicle or the variation in movement of the suspension detected by the vehicle behavior detection means becomes larger.

5. The steer-by-wire system as set forth in claim 1, further comprising:
vehicle behavior detection means for detecting a vertical acceleration of the vehicle or the movement of a suspension provided on the vehicle; and wherein:
the command value generation means is constructed to make the first gain (G1) larger as the vertical acceleration of the vehicle or the variation in movement of the suspension detected by the vehicle behavior detection means becomes larger.

6. The steer-by-wire system as set forth in claim 1, further comprising:
an inter-steerable wheel shaft interposed between the pair of the steerable wheels; and
a rack-and-pinion mechanism or a ball screw mechanism provided between the inter-steerable wheel shaft and the steering motor for converting the output rotation of the steering motor into the linear motion of the inter-steerable wheel shaft; and wherein:
the steering position detection means is constructed to detect the linear motion of the inter-steerable wheel shaft as the steering position.

7. The steer-by-wire system as set forth in claim 1, wherein:
the second made-up value determination means is constructed to determine the second steering reaction force made-up value (Hc2) in dependence on the steering position and a time-differentiated value of the steering position.

8. The steer-by-wire system as set forth in claim 1, wherein:
the second made-up value determination means is constructed to determine the second steering reaction force made-up value (Hc2) in dependence on the steering position and a vehicle speed.

9. The steer-by-wire system as set forth in claim 1, wherein:
the second made-up value determination means is constructed to determine the second steering reaction force made-up value (Hc2) in dependence on the steering position, a time-differentiated value of the steering position and a vehicle speed.

10. The steer-by-wire system as set forth in claim 9, further comprising:
a first data map having a first coefficient correlated with the vehicle speed in advance; and
a second data map having a second coefficient correlated with the vehicle speed in advance; and wherein:
where symbol ($\theta$) denotes the steering position, symbol ($\omega$) denotes a time-differentiated value of the steering position, symbol (V) denotes the vehicle speed, symbol (Kv) denotes the first coefficient determined from the vehicle speed (V), symbol (Dv) denotes the second coefficient determined from the vehicle speed (V), and symbol (Hc2) denotes the second steering reaction force made-up value, the second made-up value determination means is constructed to determine the second steering reaction force made-up value (Hc2) by the following expression:

$$Hc2 = Kv \cdot \theta + Dv \cdot \omega.$$

* * * * *